US010286322B1

(12) United States Patent
Wakeford et al.

(10) Patent No.: US 10,286,322 B1
(45) Date of Patent: May 14, 2019

(54) SYSTEM AND METHOD FOR DETERMINING AND EXECUTING ACTIONS IN AN ONLINE GAME

(71) Applicant: Electronic Arts Inc., Redwood City, CA (US)

(72) Inventors: Kent Wakeford, Hillsborough, CA (US); David Hernandez-Cerpa, San Francisco, CA (US); Tyler Gee, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 516 days.

(21) Appl. No.: 15/006,054

(22) Filed: Jan. 25, 2016

(51) Int. Cl.
A63F 13/67 (2014.01)
A63F 13/57 (2014.01)
G06F 3/01 (2006.01)
A63F 13/54 (2014.01)
A63F 13/5375 (2014.01)
A63F 13/285 (2014.01)

(52) U.S. Cl.
CPC ............ A63F 13/67 (2014.09); A63F 13/285 (2014.09); A63F 13/5375 (2014.09); A63F 13/54 (2014.09); A63F 13/57 (2014.09); G06F 3/015 (2013.01)

(58) Field of Classification Search
CPC ...................................................... G06F 3/015
See application file for complete search history.

(56) References Cited

U.S. PATENT DOCUMENTS 6,400,940 B1 6/2002 Sennett
6,763,384 B1 7/2004 Gupta
7,124,175 B1 10/2006 Wolfe
7,788,176 B2 8/2010 Gupta
7,955,175 B1 * 6/2011 Holloway ............. A63F 13/822
273/317.1
8,038,535 B2 10/2011 Jensen
(Continued)

FOREIGN PATENT DOCUMENTS

WO 2001035600 5/2001

OTHER PUBLICATIONS gw.igg.com, Godswar, Aug. 14, 2009, www.archive.org, 9 pages.
www.thebuddyforum.com, Honorbuddy1, Apr. 14, 2011, 6 pages.
www.thebuddyforum.com, Honorbuddy2, Mar. 11, 2011, 5 pages.

Primary Examiner — Robert T Clarke, Jr.
(74) Attorney, Agent, or Firm — Knobbe, Martens, Olson & Bear, LLP

(57) ABSTRACT

A system and method for determining and executing actions in an online game. An instance of an online game may be executed and participation of the users in the online game may be facilitated through a client game application implemented on the client computing platforms. The gameplay of the users may be monitored in the instance of the online game to determine gameplay information. User accounts comprising user information, which may include gameplay information and/or user presence information, may be managed. Occurrences in the online game may be identified. One or more actions to be executed in the online game may be determined. The actions may be determined based on the gameplay information and/or in response to the occurrences identified. The one or more determined actions may be executed in the online game without launching the client game application.

16 Claims, 5 Drawing Sheets

(56) References Cited

U.S. PATENT DOCUMENTS

| | | |
|---|---|---|
| 8,393,967 B2 | 3/2013 | Farrier |
| 8,430,755 B2 | 4/2013 | Youm |
| 8,734,254 B2 | 5/2014 | Aguilar, Jr. |
| 8,764,568 B2 | 7/2014 | Holme |
| 8,771,081 B2 | 7/2014 | Walker |
| 8,805,939 B2 | 8/2014 | Ye |
| 8,840,465 B2 | 9/2014 | Mello |
| 9,616,345 B2 | 4/2017 | Harvey |
| 2004/0230661 A1 | 11/2004 | Rashid |
| 2006/0246972 A1* | 11/2006 | Thomas ............. A63F 13/10 463/4 |
| 2007/0097832 A1 | 5/2007 | Koivisto |
| 2007/0260567 A1 | 11/2007 | Funge |
| 2007/0265091 A1 | 11/2007 | Aguilar |
| 2007/0298886 A1* | 12/2007 | Aguilar, Jr. ......... G06N 3/006 463/42 |
| 2008/0090659 A1 | 4/2008 | Aguilar |
| 2009/0264190 A1 | 10/2009 | Davis |
| 2010/0029386 A1 | 2/2010 | Pitsch |
| 2010/0056280 A1 | 3/2010 | Langan |
| 2011/0016182 A1 | 1/2011 | Harris |
| 2011/0276883 A1* | 11/2011 | Cabbie ............. A63F 13/87 715/727 |
| 2012/0142429 A1 | 6/2012 | Muller |
| 2012/0179750 A1 | 7/2012 | Gollapalli |
| 2012/0238365 A1 | 9/2012 | Gaiba |
| 2012/0283014 A1 | 11/2012 | Van Luchene |
| 2013/0035164 A1 | 2/2013 | Osvald |
| 2013/0054689 A1 | 2/2013 | Woldman |
| 2013/0090170 A1 | 4/2013 | Reed |
| 2013/0172068 A1 | 7/2013 | Zhou |
| 2014/0232534 A1 | 8/2014 | Birnbaum |
| 2014/0274297 A1* | 9/2014 | Lewis ............. A63F 13/00 463/20 |
| 2014/0357350 A1 | 12/2014 | Weingardt |
| 2015/0065095 A1 | 3/2015 | Seo |
| 2015/0172441 A1 | 6/2015 | Samhat |
| 2015/0341901 A1 | 11/2015 | Ryu |

\* cited by examiner

SYSTEM AND METHOD FOR DETERMINING AND EXECUTING ACTIONS IN AN ONLINE GAME

FIELD OF THE DISCLOSURE

This disclosure relates to a system and method for determining and executing actions in one or more online games.

BACKGROUND

User may interact with online games via game applications on their client computers. Typically, a user inputs commands via a game interface to initiate the execution of actions within the online game. Users may respond things that occur within the online game by inputting one or more commands via the game application. However, if a user cannot or does not want to launch the game application, the user may not be able to respond and/or initiate actions in response to things that occur within the online game. As such, users that are not able to or do not want to access, launch, and/or run the game application may be disadvantaged as events and/or occurrences happen within the online game, and the user cannot respond.

SUMMARY

One aspect of the disclosure relates to determining and executing actions in one or more online games. The actions may be determined responsive to an occurrence in the online game being identified. An occurrence in an online game may include something that happens and/or occurs within the online game and/or virtual space that may impact and/or affect the user's gameplay, virtual items and/or entities under the user's control, and/or other aspects of the user's interaction with the online game and/or virtual space. The actions to be executed for a given user may be determined based on learned behavior of the given user in a given online game. Learned behavior of a given user may be indicated by gameplay information that includes and/or is determined based on past user responses and/or actions in the online game. The determined action(s) may be executed in the online game responsive to a determination that the user is not presently participating in the online game. Determination and/or execution of the one or more determined actions may not require the client game application, via which the user typically accesses the online game, to be running. As such, the client game application may not be launched for determination and/or execution of the one or more determined actions. In some implementations, notifications indicating occurrences and/or execution of one or more actions in the online game(s) may be generated. Because the actions may be determined and/or executed without launching the client game application, the user may continuously interact with and/or execute actions (e.g., via actions executed by the system on behalf of the user) within the online game without having to run the client game application. As such, the user may not be disadvantaged and/or miss out executing actions in response to occurrences within the online game regardless of whether the user is available; their client computing platform has the capability and/or capacity to efficiently launch and/or run the client game application; and/or the client computing platform associated with the user has an internet connection.

A system configured to determine and execute actions in one or more online games may include one or more servers. The servers may operate in a client/server architecture with one or more client computing platforms. The client computing platforms may be associated with the users of the online game. The servers may be configured to execute one or more of: a game component, a gameplay component, a user component, an occurrence identification component, an action component, a notification component, and/or other components. The client computing platforms may be configured to execute one or more components the same as or similar to the servers.

The game component may be configured to execute one or more instances of an online game. The instance of the online game may include a virtual space associated with the online game. The game component may receive commands from client computing platforms associated with users. The commands may be executed within the online game to facilitate participation of the users in the online game through a client game application implemented on the client computing platforms. Views of the online game and/or a virtual space in which the online game takes place may be presented in game interfaces for the online game on the client computing platforms by running the client game application.

The gameplay component may be configured to monitor gameplay of the users in the instance of the online game. Monitoring the gameplay of users may include tracking and/or storing information related to the game commands received from the client computing platforms associated with the users. The gameplay component may be configured to monitor the gameplay of the users to determine gameplay information. The gameplay information may indicate learned behavior of the users in the online game. For example, gameplay information may indicate a user's in-game behavior generally, in response to one or more occurrences, and/or in response to other aspects of gameplay in the online game. The gameplay information may include and/or be determined based on past response information for a given user indicating past responses and/or past game commands requested by the given user.

The user component may be configured to manage one or more user accounts comprising user information regarding the users of the online game. The user information may include one or more of gameplay information, user presence information, user activity information, and/or any other user information. The gameplay information may indicate learned game behavior of the users in the online game. Whether the user is participating in any online game via a client game application may be indicated by the user presence information. The user activity information may relate to the current activity of a user in the real world.

The occurrence identification component may be configured to identify occurrences in the online game. In some implementations, the occurrence identification component may be configured to identify occurrences within online games and/or the virtual space(s) of the online game(s). An occurrence may include something that happens and/or occurs within the virtual space and/or online game that may impact and/or affect the user's gameplay, virtual items and/or entities under the user's control, and/or other aspects of the user's interaction the online game. The identification of the occurrences in the virtual space(s) may involve monitoring state changes taking place in the virtual space(s), determining an occurrence has happened when certain state changes have taken place in the virtual space(s), determining participation in the online game(s) by one or more users that may be impacted by a particular occurrence in a given online game, and/or any other operations. The occurrences identified by the occurrence identification component may include a first occurrence that is identified based on first occurrence information indicating the first occurrence in the online game. The first occurrence may relate to participation by the first user in the online game and/or within virtual space.

The action component may be configured to determine one or more actions to be executed in the online game. The one or more actions may be executed for the users (e.g., on behalf of the users) without the users having to select and/or input the commands to execute the actions via the client game application. The one or more actions may be determined responsive to one or more of: an occurrence being identified, a determination that the given user is not presently participating in the online game through any client game application (e.g., determined based on the user presence information), and/or any other information and/or happening. The one or more actions to be executed for a given user may be determined based on one or more of: gameplay information, user activity information, user presence information, other user information (e.g., included in user accounts managed by the user component), and/or other information. For example, the one or more actions determined for a given user may be based on the gameplay information for the given user indicating learned game behavior of the given user. In some implementations, the one or more actions determined may include a set of actions.

The action component may include one or more subcomponents such as, a user gameplay analysis component, a user presence information analysis component, an action determination component, an action execution component, and/or any other components. The user gameplay analysis component may be configured to receive and/or obtain gameplay information, and/or to analyze the gameplay information to determine and/or identify one or more learned behaviors of the users. The user presence information analysis component may be configured to receive and/or obtain user presence information, to analyze the user presence information, and/or to determine whether one or more users are presently participating in the online game through any client game application. The action determination component may be configured to receive and/or obtain information indicating occurrences in the online game(s), instruct the user gameplay analysis component to analyze gameplay information, instruct the user presence information analysis component to analyze user presence information, determine one or more actions to be executed in the online game, and/or perform other functionality.

The action component and/or the game component may be configured to execute one or more of the determined actions in the online game. The one or more determined actions may be executed in the online game without launching the client game application. The action component may generate, communicate, and/or transmit one or more action requests corresponding to the one or more actions determined to the game component for execution within the online game. The one or more determined actions may be determined and/or executed in the online game without launching and/or running the client game application. A given action may be executed within the online game on behalf of the user without receiving user input corresponding to a command. As such, for example, one or more actions may be executed on behalf of the user without requiring the given client computing platform to be connected to a network and/or to run the client game application.

In some implementations, the notification component may be configured to generate notifications. The notifications may indicate one or more occurrences in the online game(s), one or more actions executed and/or to be executed in the online game(s), one or more action options, and/or other information. The one or more action options may include a cancellation option, alternative action options, a passive action option, a confirmation and/or acceptance action option, and/or other action options. The notifications may be generated by the notification component for presentation on client computing platforms and/or wearable devices.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
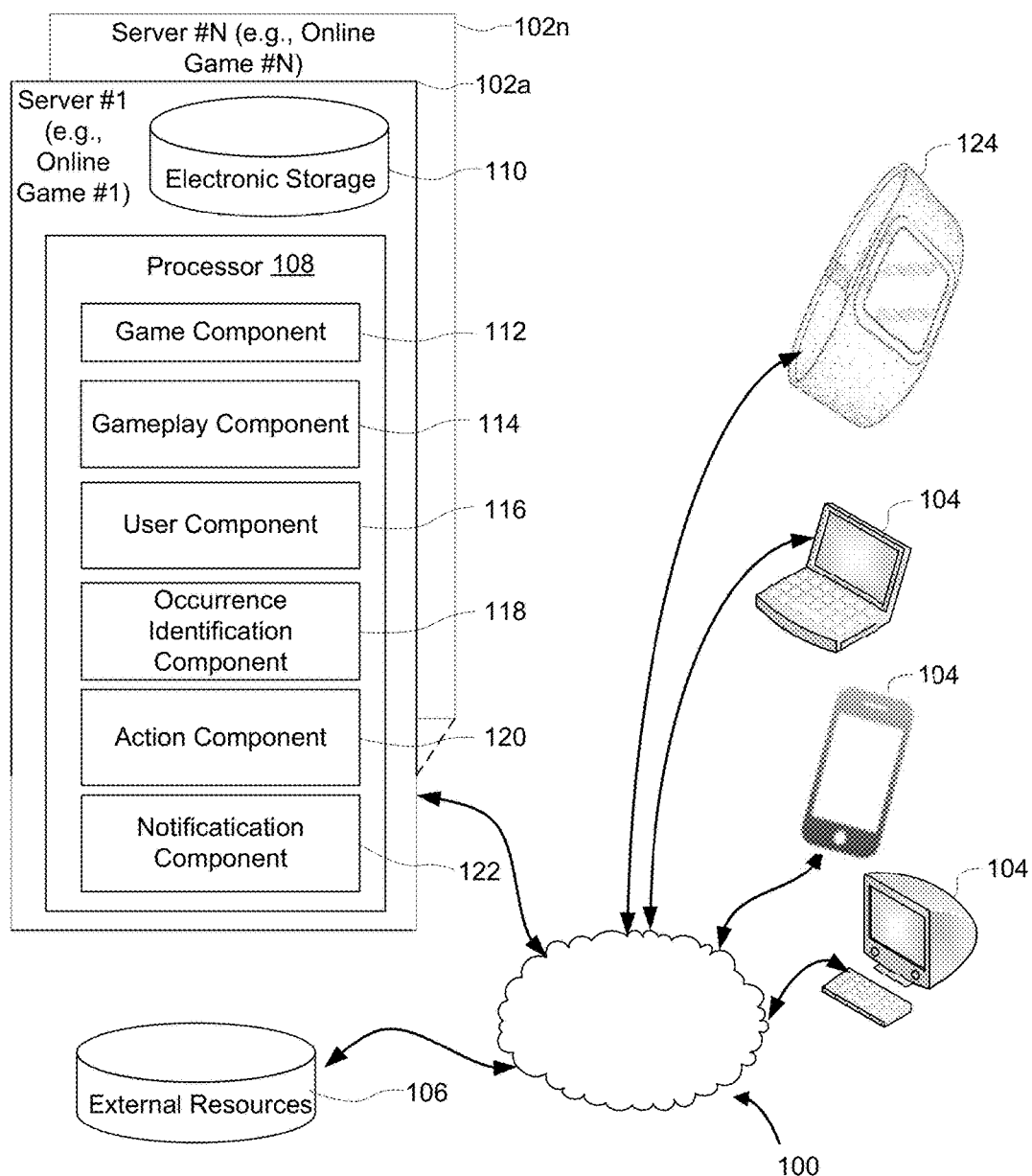
FIG. 1 illustrates a system for determining and executing actions in one or more online games, in accordance with one or more implementations.

FIG. 1 illustrates a system 100 for determining and executing actions in one or more online games. The system may provide one or more of the online games. Providing one or more of the online games may include hosting the online games over a network. In some implementations, as shown in this example, system 100 may include one or more servers 102, such as the server 102*a-n* shown, configured for hosting online games. The servers 102 may be configured to communicate with one or more client computing platforms 104 according to a client/server architecture, and with each other. The users may access system 100 and/or the game spaces associated with the online games via client computing platforms 104. As shown, a given server 102, such as the server 102*a* shown, may comprise a processor 108 configured to execute computer readable instructions to implement system components. The computer program components may include one or more of a game component 112, a gameplay component 114, a user component 116, an occurrence identification component 118, an action component 120, a notification component 122, and/or other components.

The game component 112 may be configured to execute an instance an online game. The game component 112 may be configured to implement the instance of the online game by receiving commands from client computing platforms associated with users. Game component 112 may execute the commands in the instance of the online game to facilitate participation of the users in the online game. Users may participate in the online game through client game applications implemented on the client computing platforms associated with the users. The online game(s) may include one or more strategy games and/or other games.

Within the instance of the online game, users may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the online game by game component 112 may include determining a state associated with a virtual space in which the online game is played and/or the online game. The state may be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the online game and/or the virtual space in which the online game is played may be persistent. That is, the virtual space and/or online game may continue on whether or not individual users are currently logged in and/or participating in the online game. A user that logs out of the online game and then logs back in some time later may find the virtual space and/or the online game has been changed through the interactions of other users with the virtual space during the time the user was logged out. These changes may include changes to the simulated physical space, changes in the user's inventory, changes in other users' inventories, changes experienced by non-user characters, and/or other changes.

The instance of the online game and/or the virtual space in which the online game takes place may comprise a simulated virtual space, e.g., a virtual space that is accessible by users via clients (e.g., client computing platforms 104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game and/or the virtual space in which an online game takes place may comprise virtual space entities automatically controlled in the instance of the online game. Such virtual space entities may not be associated with any user. As such, the automatically controlled virtual space entities may be generated and/or developed by artificial intelligence configured with the server(s) 102 by a provider, administrator, moderator, and/or any other entities related to the online game. These automatically controlled entities may evolve within the virtual space associated with the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 102. As used herein, such automatically controlled virtual space entities in the instance of the online game are referred to as "non-player entities".

It should be understood the above description of the manner in which state of the virtual space associated with the online game as determined by game component 112 is not intended to be limiting. The game component 112 may be configured to express the virtual space in a more limited, or richer, manner. For example, views determined for the virtual space representing the state of the instance of the online game and/or virtual space may be selected from a limited set of graphics depicting an occurrence in a given place within the virtual space for the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the online game executed by game component 112, the users may participate by controlling one or more of an element in the virtual space associated with the online game. The user-controlled elements may include avatars, game space characters, game space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the virtual space may be exercised through commands input by a given user through client computing platforms 104. The given user may interact with other users through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the game component 112).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

The game component 112 may be configured to execute user actions to facilitate participation of the users in the online game, the virtual space associated with the online game, and/or each other in response to receiving game commands input by the users. Execution of the user action by the game component 112 may produce changes to the game state, which may reflect progresses and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

Gameplay component 114 may be configured to monitor gameplay of the users in the instance of the online game. Monitoring the gameplay of users may include tracking and/or storing game commands and/or information related to the game commands received from the client computing platforms associated with the users. In some implementations, the game commands tracked and/or stored may be received in connection with general gameplay and/or in response to one or more occurrences in the online game. The game commands requested by a given user may indicate a user's typical gameplay and/or response to one or more occurrences. Gameplay component 114 may be configured to monitor the gameplay of the users to determine gameplay information. The gameplay information may indicate learned behavior of the users in the online game. For example, gameplay information may indicate a user's in-game behavior generally, in response to one or more occurrences, and/or in response to other aspects of gameplay in the online game. The gameplay information corresponding to a given user may, for example, include and/or be determined based on past responses and/or past game commands requested by the given user.

For instance, gameplay information may include and/or be determined based on past response information. Past response information for a given user may describe the given user's past response(s) and/or requested game command(s). In some implementations, gameplay component 114 may be configured to obtain past response information for the first user regarding past responses to one or more of the occurrences in the online game by the first user. Gameplay component 114 may be configured to determine the first gameplay information based on the past response information for the first user.

For example, a given user's past response information may indicate that the given user took a defensive action in response to his/her base being attacked (e.g., an example first occurrence) in the online game the last 3 times his/her base was attacked. The gameplay information may indicate that a learned behavior of the given user is to take defensive action after his/her base is attached. As another example, the response information for a given user may indicate that the given user did not take an action within 5 minutes after a character of the given user recovered full stamina in the online game. The gameplay information for the given user may indicate that a learned behavior of the given user is to not take any immediate action after a character of the given user recovers full stamina in the online game. The specificity of the requested commands and/or responses to occurrences monitored and/or tracked by gameplay component 114 may be designated and/or determined by the provider of the online game, the user, and/or a provider of system 100. For example, a date and/or time when the user took the action after his/her base was attacked in the virtual space of the first online game and/or a real-world location where the user took the action may be monitored, tracked, and/or stored by gameplay component 114.

In some implementations, the past response information (e.g., which may be used as a basis for determining the gameplay information) may include a frequency at which the given user initiated an action or actions after the first occurrence in the first online game. For example, without limitation, the past response information may indicate the given user initiated on average 5 actions every 10 occurrences of his/her base was attacked in the virtual space of the first online game. As another example, the past response information may indicate the given user initiated on average 10 actions every week after his/her base was attacked in the virtual space of the first online game. Continuing the example, the gameplay information determined may indicate that a learned behavior of the given user is to initiate up to a maximum number of actions in response to the identification of an occurrence in the online game.

In some implementations, the past response information may indicate average time elapse between the first occurrence in the virtual space of the first online game and the given user initiated an action or actions in the first online game. For example, the past response information may indicate that the given user initiated an action on average one minute after his/her base was attacked in the virtual space of the first online game. Continuing the example, the gameplay information determined may indicate that a learned behavior of the given user is to initiate an action immediately responsive to an occurrence being identified. As another example, the past response information may indicate that the given user initiated an action on average one hour after his/her virtual character becomes available for the given user to use in the virtual space of the first online game. Continuing the example, the gameplay information determined may indicate that a learned behavior of the given user is to wait and not initiate any immediate actions in response to an occurrence within the online game.

In some implementations, the past response information may indicate average spending by the given user after the first occurrence in the virtual space of the first online game. For example, the past response information may indicate that the given user spent, on average, 3 dollars after every occurrence of his/her base being attacked in the virtual space of the first online game. Continuing the example, the gameplay information determined may indicate that a learned behavior of the given user is to spend more than $1 but less than $5 to execute an action in response to an occurrence being identified. As another example, the past response information may indicate that the given user spent no money after every occurrence of his/her virtual character becoming available for the given user to use in the virtual space of the first online game. Continuing the example, the gameplay information determined may indicate that a learned behavior of the given user is to not spend any money in response to an occurrence being identified in the online game.

Gameplay component 114 may be configured to determine the gameplay information continuously and/or in a re-occurring manner. The gameplay information for a given user may be determined based on the past response information for the given user. As a user continues to play and/or further interact with the online game, the gameplay information may be updated. In some implementations, the gameplay information may be monitored, determined, and/or updated in a real time, near real time, at intervals (e.g., each time the user launches and/or exits the client game application, each hour/day/week, etc.,) and/or in an otherwise continuous manner.

User component 116 may be configured to manage one or more user accounts associated with individual users of the online game(s). The user accounts managed by the user component 116 may include user information regarding the individual users of the online game(s). The user information may be stored in a network storage location such as the electronic storage 110, and/or any other storage locations. User component 116 may be configured to manage user accounts comprising user information regarding the users. The user information managed by user component 116 and/or included in the user accounts may include the gameplay information for the users. The user information managed by user component 116 may include user presence information. User presence information may indicate whether the users are presently participating in the online game through the client game applications. For example, a user account associated with a given user may include user presence information indicating whether or not the given user is presently participating in the online game through a client game application. The user presence information may be updated in real-time and/or near real time. As such, for example, the user presence information may indicate, at any given time, whether or not the user is presently participating in the online game through any client game application. In some implementations, whether or not the user is presently participating in the online game through a client game application may be determined based on whether the client game application is running on the client computing platform associated with the user.

In some implementations, the user information may include information reflecting a balance of stored consideration associated with the individual user usable in the given online game. The stored consideration may include, for example virtual currencies, real-world money, virtual objects, virtual resources, real-world objects (e.g., coupons) and/or any other stored consideration usable in the online game. Balances of such stored consideration may be maintained, modified, account, retrieved, tracked, and/or otherwise managed by the user component 116. By way of non-limiting example, the user information in the user account associated with the user for the online game may reflect that the user has 50 gems (e.g., a virtual currency) in the online game; and/or the user information in the user account associated with the user for the online game may reflect that the user has 30 ores (e.g., a virtual currency) in the second online game.

The user information in the user account associated with the given user for a given online game hosted by system 100 may include historic transaction information indicating previous spending by the user in the given online game. In some exemplary implementations, such historic transaction information may reflect various statistics and details about the individual spending by the user in the given online game. Examples of such statistics may include a number of times a user spends virtual currency in exchange for virtual items (e.g., a number of transactions), a frequency of such spending by the user with in a time period of interest (e.g., past 24 hours, past week, past month, etc.), an average amount spent by the user, an average amount spent by the user to forgo a particular active action in a time period of interest, and/or any other statistics.

In some implementations, user component 116 may be configured to obtain, receive, and/or determine user activity information regarding current activity in the real-world by the given user. The activity information obtained by the user component 116 may indicate a current activity including jogging, walking, driving, sleeping, swimming, and/or any other type of activity by the given user in the real-world. In some implementations, the user component 116 may obtain and/or receive the user activity information from personal devices associated with the users, such as client computing platform(s) 104, wearable device 124, sensors, and/or any other type of personal device associated with the given user.

The user component 116 may be configured to manage the gameplay information determined for one or more users. The gameplay information for a given user may indicate learned game behavior of a given user. For example, whether or not the given user would typically respond to the one or more occurrences by initiating action requests through the client game application. For example, without limitation, gameplay information may indicate whether the given user would initiate an action or actions, and/or which action or actions a user would initiate in response to the first occurrence in the virtual space of the first online game. In some implementations, the past responses may indicate gameplay initiated by the user in the first online game after and/or in response to the first occurrence.

The occurrence identification component 118 may be configured to identify occurrences in one or more online games. For example, the occurrence identification component 118 may be configured to identify occurrences in one or more virtual spaces associated with one or more online games hosted by system 100. The occurrence identification component may obtain occurrence information regarding occurrences in the online game. The identification of the occurrences in the online game by the occurrence identification component 118 may include one or more of: monitoring state changes taking place in the virtual space(s) and/or online game(s), determining an occurrence has happened when a particular state change is identified in the online game(s) and/or virtual space(s) in which the online game(s) are played, determining participation in the online game(s) by one or more users that may be impacted by the one or more occurrences in the online game(s), and/or any other operations. In some implementations, for example, an occurrence may include something that happens and/or occurs within the online game and/or virtual space that may impact and/or affect the user's gameplay, virtual items and/or entities under the user's control, and/or other aspects of the user's interaction with the online game and/or virtual space. By way of non-limiting example, an occurrence may include one or more of: an event (e.g., a tournament, quest, etc.) and/or results of an event available to the user within the online game; an attack, raid, and/or other phenomena that has transpired in the online game impacting the user's base and/or virtual entity; a virtual resource and/or entity being upgraded and/or being able to be upgraded; virtual building(s) or equipment associated with the user being ready to be employed (e.g., used); virtual character(s) and/or troop(s) being ready to be deployed (e.g., used); virtual character(s) having recovered stamina and/or health (e.g., from injuries or past use), and/or any other occurrences within the online game and/or virtual space.

Occurrence identification component 118 may identify occurrences in the online game based occurrence information indicating one or more occurrences. Whether or not occurrence information indicates an occurrence may be determined based on occurrence criteria. The occurrence criteria may be determined and/or selected by a user, online game provider, system provider, and/or other entity. Responsive to the occurrence information satisfying the occurrence criteria for an occurrence within the online game, occurrence identification component 118 may identify an occurrence within the online game.

By way of example, without limitation, a state change indicating a first occurrence may include an earthquake has taken place in a particular area in the virtual space associated with the online game. After identifying such a state change in the virtual space of the online game, the occurrence identification component 118 may determine the size and location of the area where the earth quake took place. After determining such, the occurrence identification component 118 may determine that a number of players of the online game have built their virtual towns in the area affected by the earth quake and thus those players' participation in the online game is impacted by the earthquake. For instance, the occurrence identification component 118 may determine the earthquake impacts the participation of a number of players including the first player in the online game because the first player has a virtual town in the area where the earthquake affects. As such, an occurrence may be identified for the users impacted.

Action component 120 may be configured to determine one or more actions to be executed in the online game. The one or more actions may be executed for the users (e.g., on behalf of the users) in the online game. The one or more actions to be executed may be determined based on the gameplay information. For example, an action to be executed for a given user in response to an occurrence may be determined based on the gameplay information associated with the given user. The one or more actions may be determined responsive to an occurrence being identified, a determination that the given user is not presently participating in the online game through any client game application, and/or any other information and/or happening. The determination that the given user is not presently participating in the online game may be determined based on the user presence information.

The one or more actions determined by action component 120 may be based on learned user behavior indicated by the gameplay information. For example, the gameplay information may indicate the user typically takes immediate action when the user's base is attacked by deploying troops and/or sending a message to alliance members for assistance. Continuing the example, the one or more actions determined by action component 120 may include deploying the user's troops and/or sending a message to alliance members requesting assistance. In some implementations, continuing the example, action component 120 may be configured to determine the one or more actions based on state information regarding the given online game, user information (e.g., user activity information, stored consideration, user settings/preferences, and/or other user information), user entity and/or character information (e.g., stamina/health of user characters and/or entities, availability of user characters and/or entities, skill of user character and/or entities, gameplay information, user presence information, and/or other user entity/character information), and/or other information. By way of another example, if the gameplay information indicates the user's spending behavior in the online game is frequent and consistent, the one or more actions determined by action component may include a pay to perform action that is associated with a real world and/or virtual world cost. Continuing the example, action component 120 may determine the one or more actions based on gameplay information and/or user information indicating the user typically averages spending $10 on in-game actions per a given time period (e.g., one or more day(s), week(s), month(s), hour(s), and/or other time periods), that the user has set a maximum allowed cost per given time period, and/or that the user has previously spent $7 in the online game during the current time period. As such, continuing the example, one or more actions may be determined based on the gameplay information, the user information, and/or the cost associated with the one or more actions such that action component 120 may determine that an action that costs $2.99 should be executed in the online game rather than an action that costs $3.99.

In some implementations, actions may be determined by action component 120 based on user activity information regarding a users' current activity in the real-world by the given user. The user activity information may be obtained by action component 120 from user component 116 and/or other sources. The user activity information, for example, may indicate that the user is performing one or more real-world activities (e.g., driving, sleeping, etc.) and/or whether or not the user may be available to interact with the online game via a client game application.

In some implementations, actions may be determined by action component 120 based on one or more predetermined rules. The predetermined rules may be determined and/or derived by action component 120; and/or may be determined and/or selected by a user, online game provider, system provider, and/or other entity. The predetermined rules may indicate and/or be based on user preferences, user selections and/or indications, an analysis of past responses, gameplay, occurrences, and/or other information. For example, the predetermined rules may include a rule indicating a given action (e.g., to defend the user's base, to retreat, to ask alliance members for help, etc.) should be implemented responsive to identification of a given occurrence and/or an occurrence of a given type.

In some implementations, the one or more actions determined by action component 120 may include a set of actions. The set of actions may include a series of actions to be executed in the online game. The set of actions may be determined by action component based on one or more of: gameplay information, user presence information, user activity information, and/or other information. The set of actions may include a predetermined series of actions. In some implementations, the set of actions may be determined one by one by action component 120 based on the outcome and/or execution of the preceding action and/or other actions executed within the online game.

Figure 2:
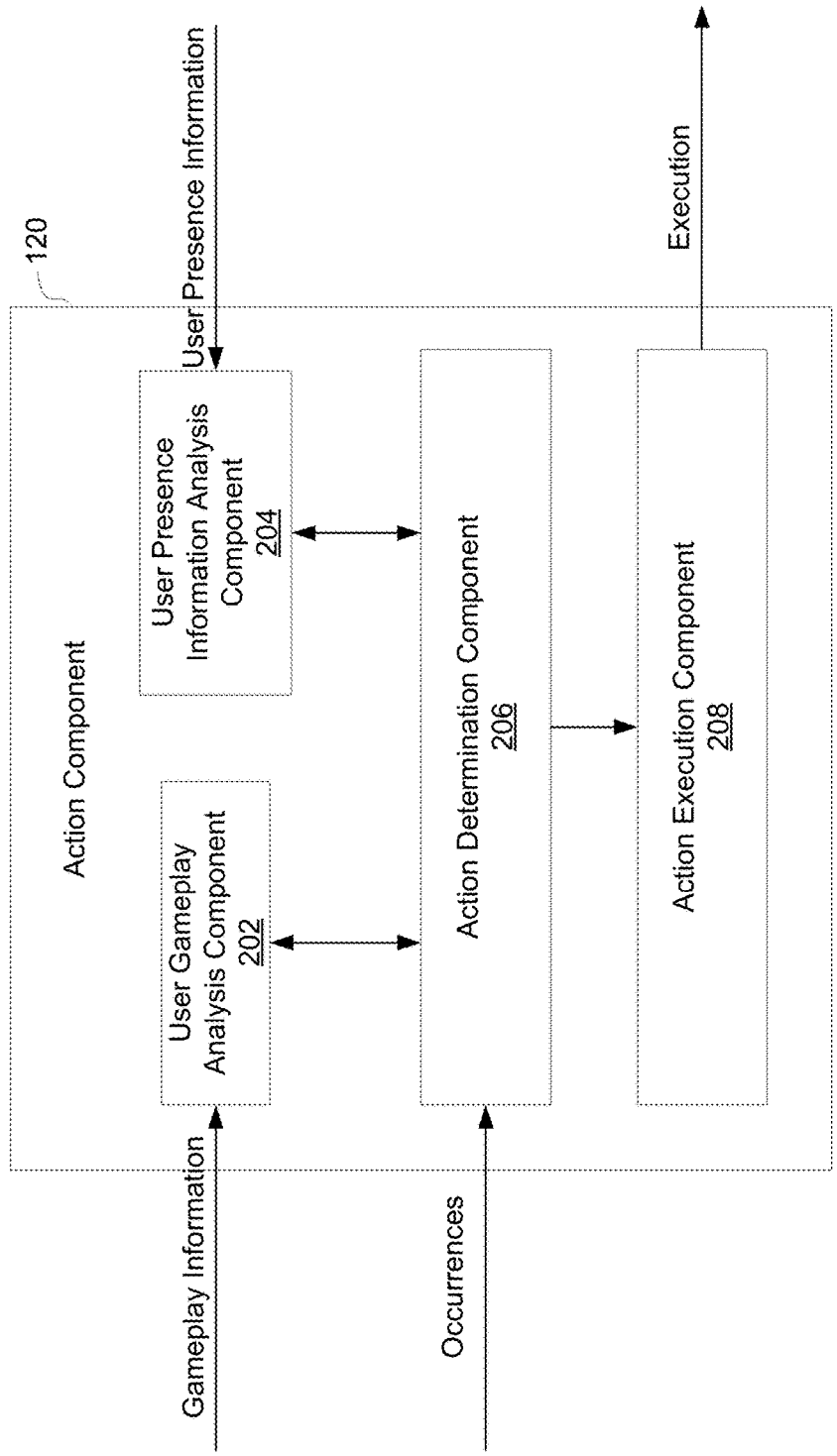
FIG. 2 illustrates an exemplary implementation of the action component shown in FIG. 1, in accordance with one or more implementations

FIG. 2 illustrates an exemplary implementation of action component 120 shown in FIG. 1, in accordance with one or more implementations. As shown in FIG. 2, the action component 120 may comprise a user gameplay analysis component 202, a user presence information analysis component 204, an action determination component 206, an action execution component 208, and/or any other components.

The user gameplay analysis component 202 may be configured to receive gameplay information. The gameplay information received at user gameplay analysis component 202 may include and/or be determined (e.g., by gameplay component 114 as illustrated in FIG. 1) based on past response information and/or other information. By way of example, the user gameplay analysis component 202 may analyze the gameplay information to determine and/or identify one or more learned behaviors of the users. The learned behaviors may include one or more of: whether or not a user typically initiates an action in response to a given occurrence; typical user responses and/or actions requested in response to a given occurrence in the online game; the typical frequency at which the given user initiates an action during a predetermined period after the given occurrence; the average time that typically elapses between the given occurrence and when the user initiates an action; whether or not the user typically initiates and/or requests actions associated with a real world and/or virtual world cost in response to one or more occurrences in the online game; how much consideration (e.g., real-world and/or virtual currency) a user typically spends on action requests in response to one or more occurrences in the online game for a given period of time; a rate at which the user spends consideration in response one or more occurrences in the online game; and/or any other learned user behaviors. Typical behavior and/or typically may indicate that the user has taken/requested a given action: more times than not; in response to at least 51% and/or any other percent of the same and/or similar occurrences; for multiple successive and/or preceding occurrences; in response to an immediately preceding occurrence that is the same as or similar to the given occurrence; and/or any other indication of a user's likely and/or standard behavior within the online game.

For instance, user gameplay analysis component 202 may determine a learned behavior of the user is that the user typically takes immediate action (e.g., within 1 minute) when the user's base is attacked by deploying troops and/or sending a message to alliance members for assistance. By way of another example, user gameplay analysis component 202 may determine the user's spending behavior is frequent and/or consistent, and/or that the user, on average, spends $10 per week on actions requests in response to one or more occurrences in the online game.

The user presence information analysis component 204 may be configured to analyze the user presence information (e.g., managed by user component 116) to determine whether one or more users are presently participating in the online game through any client game application. The user presence information may be obtained by user presence information analysis component, for example, from user component 116. Using the received user presence information, the user presence information analysis component 204 may determine whether the client computing platform associated with a user has launched and/or is running any client game application for the online game.

The action determination component 206 may be configured to receive information indicating occurrences in the online game(s). For example, the action determination component 206 may receive such information from the occurrence identification component 118. For example, the action determination component 206 may receive information indicating a given occurrence in the online game. Upon receiving such information, the action determination component 206 may be configured to instruct the user gameplay analysis component 202 to analyze gameplay information and/or to instruct the user presence information analysis component 204 to analyze user presence information. The action determination component 206 may be configured to determine one or more actions to be executed in the online game. The one or more actions to be executed in the online game may be executed responsive to one or more occurrences being identified. The one or more actions may be determined by action determination component 206 based on the results of the analyses by the user gameplay analysis component 202 and/or user presence information analysis component 204.

For example, the one or more actions determined by action determination component 206 may include deploying the user's troops and/or sending a message to alliance members requesting assistance. By way of another example, action determination component 206 may be configured to determine the one or more actions based on the analysis from user gameplay information component and/or user presence information analysis component 204, state information regarding the given online game, user information (e.g., stored consideration, user settings/preferences, and/or other user information), user entity and/or character information (e.g., stamina/health of user characters and/or entities, availability of user characters and/or entities, skill of user character and/or entities, and/or other user entity/character information), and/or other information. The action execution component 208 may cause the execution of the one or more actions determined by action determination component 206 to be executed in the online game. Causing the execution of the one or more determined actions may include generating and/or communicating action requests to game component 112 for execution within the online game.

Returning to FIG. 1, action component 120 and/or game component 112 may be configured to execute one or more of the determined actions in the online game. The one or more determined actions may be executed in the online game without launching the client game application. The execution of the one or more actions in the online game may be responsive to identification of one or more of the occurrences by occurrence identification component 118. By way of non-limiting example, action component 120 may generate, communicate, and/or transmit one or more action requests corresponding to the one or more actions determined to game component 112 for execution within the online game. The one or more determined actions may be executed in the online game without launching and/or running the client game application. As such, for example, a given action (e.g., determined by action component 120) may be executed in the online game without requiring the given client computing platform to be connected to a network and/or running the client game application.

In some implementations, notification component 122 may be configured to generate notifications. The notifications may include game notifications. The notifications may indicate one or more occurrences in the online game(s), one or more actions executed and/or to be executed in the online game(s), one or more action options, and/or other information.

Notification component 122 may generate notifications for presentation to a given user on a client computing platform associated with a given user. The notifications may be generated in response to one or more of: the occurrence information indicating an occurrence in the online game(s); a determination that the user is not participating in the online game through any client game application; the determination of one or more actions to be executed in the online game; the execution of the one or more actions in the online game; and/or any other happening(s) and/or information. For example, a notification may be generated for presentation to a given user on a client computing platform associated with the given user responsive to occurrence information indicating an occurrence in the online game, a determination that the first user is not participating in the online game through any client game application, a determination of one or more actions to be executed in the online game, execution of one or more actions in the online game, and/or other information.

The one or more notifications generated by the notification component 122 may include notifications that are generated and/or presented to the user on and/or via a client computing platform. The one or more notifications may be generated and/or presented without launching the client game application. The one or more notifications may include a visible, audible, palpable, and/or otherwise sensible communication notifying the user of one or more occurrences in the online game, one or more actions determined and/or executed in the online game, and/or other information. For example, the notifications may include one or more of a visual alert, text message, a voice notification, an audible alert, a push notification, a haptic notification, and/or any other types of notifications presented to a user on a client computing platform. In some implementations, the notifications generated by the notification component 122 may be transmitted to a wearable device 124 (e.g., via a client computing platform 104) associated with the given user for presentation of the notifications. The wearable device 124 may be separate from the client computing platform that launches the client game application. The wearable device 124 may or may not be able to launch the client game application.

The one or more notifications may include one or more action options. The action options may include a passive action option, a cancel action option, a confirmation and/or acceptance action option, one or more actions alternative to an action determined, and/or other action options. In some implementations, action component 120 may be configured to determine one or more actions alternative to an action determined to be executed in the online game. The one or more alternative actions may be executed within the online game instead of and/or in addition to the one or more determined actions (e.g., determined to be executed within the online game by action component 120). The one or more alternative actions may be executed within the online game responsive to a user selecting one or more of the alternative action options. The user may select one or more of the alternative action options via a user input on a client computing platform 104 and/or wearable device 124.

The client computing platform(s) 104 may include one or more processors, memory, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 100.

The client computing platform(s) 104 may be configured to: present a graphical representation of the virtual space corresponding to a given online game; provide controls enabling the given user to maneuver virtual items, initiate actions, and/or purchase virtual item(s) usable in the online game(s) within the virtual space associated with the online game; determine information for implementing game interfaces for the online game(s) hosted by system 100; obtain state information regarding a given online game hosted by the system 100; determine a view point of the user at a given time; determine a level of rendering of a scene in the online game based on the state information and view point; determining one or more action menus for presentation to the user in the game interface; facilitate interaction by the given user in the online game(s) and/or interaction with other users; communicate with sever(s) 102 (e.g., receive and/or transmitting information to/from servers 102); and/or provide any other functionality. In some implementations, client computing platform 104 may be the same as or different from wearable device 124. Client computing platform 104 may be configured to communicate with, transmit information to, and/or receive information from one or more of servers 102, wearable device 124, and/or other components of system 100.

Figure 3:
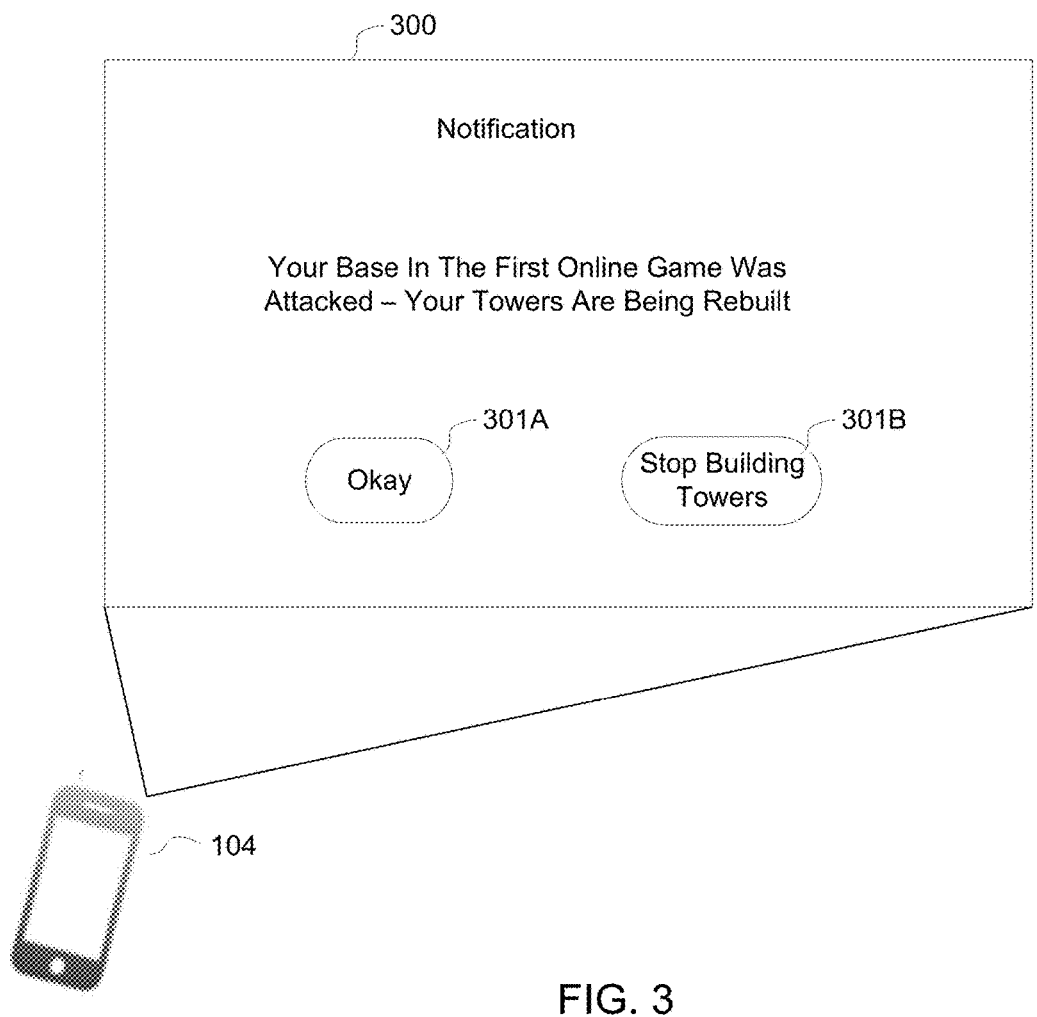
FIG. 3 illustrates an exemplary notification presented to a user, in accordance with one or more implementations.

FIG. 3 illustrates an exemplary notification presented to a user, in accordance with one or more implementations. Notification 300 may be presented on client computing platform 104. Notification 300 may be presented responsive to one or more actions to be executed being determined (e.g., by action component 120). Notification 300 may include a text notification of "Your Base In the First Online Game Was Attacked—Your Towers Are Being Rebuilt." Notification 300 may indicate the first occurrence (e.g., the user's base in the first online game was attacked) and/or the first action executed in the online game (e.g., the user's towers are being rebuilt). In some implementations, notification 300 may include one or more action options 301. Action option 301A may include an action option of "Okay" to dismiss, clear, and/or minimize the notification. Action option 301B may include a cancel option such as "Stop Building Towers." Responsive to the user selecting action option 301B, the action within the online game may be cancelled and/or not fully executed in the only game.

Figure 4:
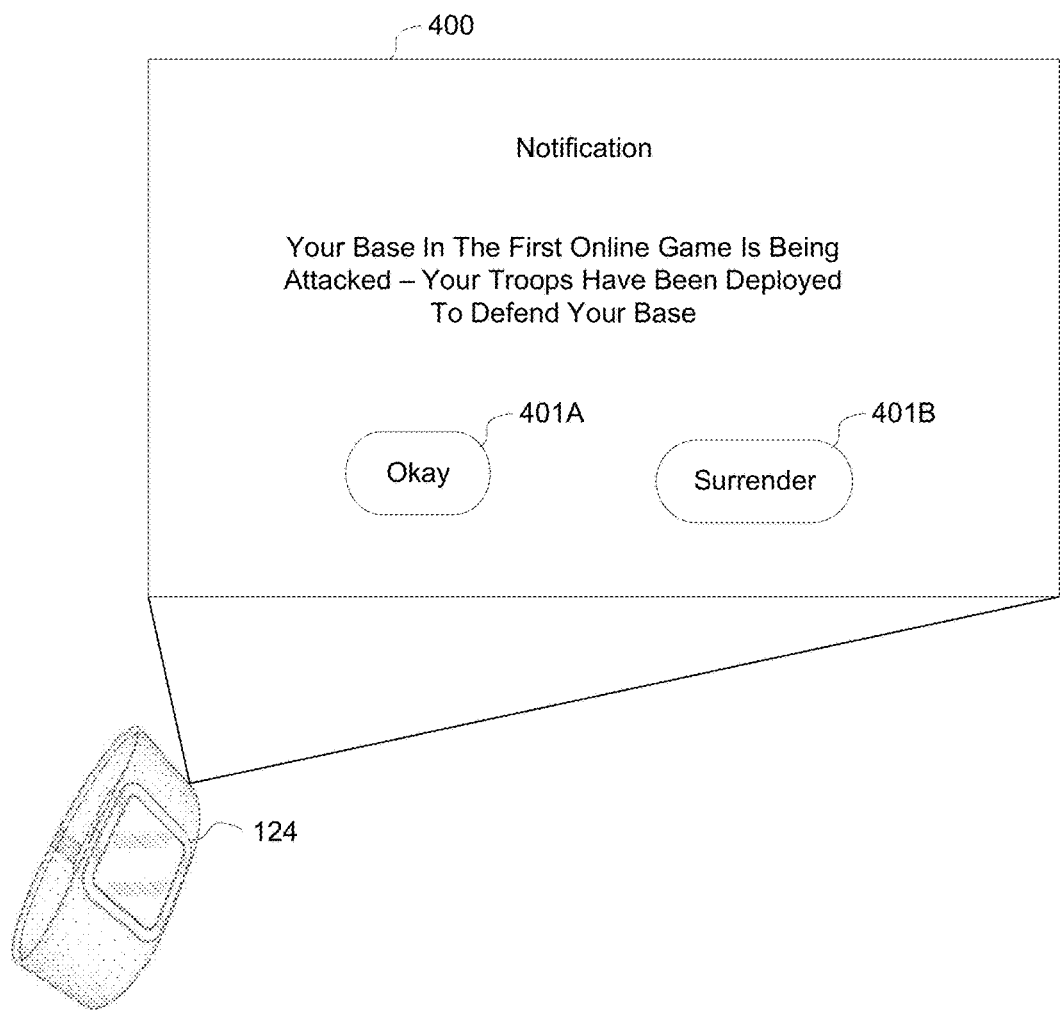
FIG. 4 illustrates another exemplary notification presented to a user in accordance with one or more implementations.

FIG. 4 illustrates a sample notification 400 including action options 401A-B being presented on a wearable device 124. Notification 400 may be presented responsive to one or more actions to be executed being determined (e.g., by action component 120). Notification 400 and action options 401 may be presented on wearable device 124. Wearable device 124 may or may not be able to launch the client game application. Notification 400 may include a text notification of "Your Base in the first Online Game Is Being attacked—Your Troops have Been Deployed to Defend your Base." Notification 400 may indicate the first occurrence (e.g., the user's base in the first online game is being attacked) and/or the first action executed in the online game (e.g., the user's troops have been deployed to depend their base). In some implementations, notification 400 may include one or more action options 401. Action option 401A may include an action option of "Okay" to dismiss, clear, and/or minimize the notification. Action option 401B may include a cancel option such as "Surrender." Responsive to the user selecting action option 401B, the action within the online game may be cancelled, repealed, and/or not fully executed in the only game. The one or more actions may be executed and/or cancelled without launching the client game application and/or requiring the user to access the client game application via a client computing platform. In some implementations, for example, notification 400 may be presented via a voice notification feature of wearable device 124 (and/or a client computing platform). The user may select one or more of the action options 401 via a voice input response received at wearable device 124 (and/or a client computing platform). The voice input response may be translated and/or transmitted to one or more client computing platforms and/or game servers.

Returning to FIG. 1, the server(s) 102, client computing platform(s) 104, the wearable device(s) 124 and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, the wearable device 124 and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The wearable device 124 associated with a given user may be worn by the given user, for example, on his/her wrist, ankle, waist, or neck, or clipped to or inside the clothing of the user. Example of the wearable device 124 may include a smart watch, smart glasses, a smart bracelet, a smart band, a smart belt, and/or any other type(s) of wearable device. Other designs of wearable device 124, such as a portable device or a device that can be attached to the user's closing, are contemplated.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server(s) 102 may include electronic storage 110, one or more processors 108, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 110 may comprise electronic storage media that electronically stores information. The electronic storage media of electronic storage 110 may include one or both of system storage that is provided integrally (i.e., substantially non-removable) with server(s) 102 and/or removable storage that is removably connectable to server(s) 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 110 may include one or more virtual storage resources (e.g., cloud storage, a virtual private network, and/or other virtual storage resources). Electronic storage 110 may store software algorithms, information determined by processor 108, information received from server(s) 102, information received from client computing platforms 104, and/or other information that enables server(s) 102 to function as described herein.

Processor(s) 108 is configured to provide information processing capabilities in server(s) 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122. Processor 108 may be configured to execute components 112, 114, 116, 118, 120, 122 by software; hardware; firmware; some combination of software, hardware, and/or firmware; and/or other mechanisms for configuring processing capabilities on processor 108.

It should be appreciated that although components 112, 114, 116, 118, 120, 122, 202, 204, 206, and 208 are illustrated herein as being co-located within a single processing unit, in some other implementations, one or more of components 112, 114, 116, 118, 120, 122, 202, 204, 206, and 208 may be located remotely from the other components. The description of the functionality provided by the different components 112, 114, 116, 118, 120, 122, 202, 204, 206, and 208 described below is for illustrative purposes, and is not intended to be limiting, as any of components 112, 114, 116, 118, 120, 122, 202, 204, 206, and 208 may provide more or less functionality than is described. For example, one or more of components 112, 114, 116, 118, 120, 122, 202, 204, 206, and 208 may be eliminated, and some or all of its functionality may be provided by other ones of components 112, 114, 116, 118, 120, 122, 202, 204, 206, and 208. As another example, processor 108 may be configured to execute one or more additional components that may perform some or all of the functionality attributed below to one of components 112, 114, 116, 118, 120, 122, 202, 204, 206, and 208.

Figure 5:
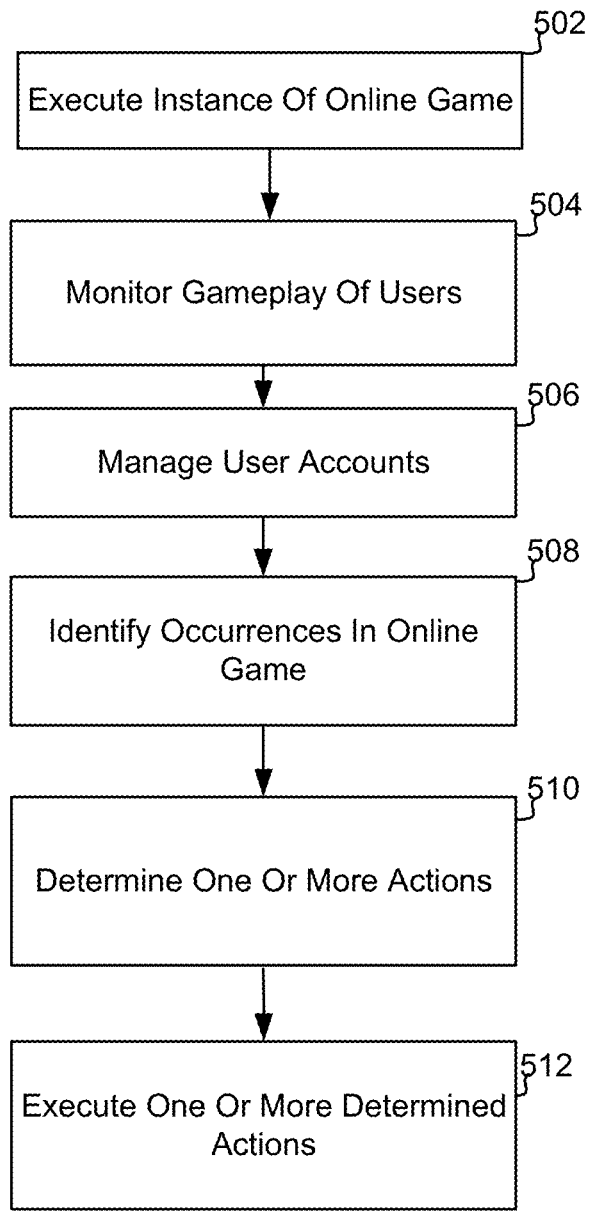
FIG. 5 illustrates a method for determining and executing actions in one or more online games, in accordance with one or more implementations.

FIG. 5 illustrates a method for determining and executing actions in one or more online games, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an instance of an online game may be executed. The instance of the online game may be implemented by receiving commands from client computing platforms associated with users and/or executing the commands in the instance of the online game to facilitate participation of the users in the online game. Participation of the users in the online game may be facilitated through a client game application implemented on the client computing platforms associated with the users. In some implementations, operation 502 may be performed by a game component the same as or similar to game component 112 (shown in FIG. 1 and described herein).

At an operation 504, gameplay of the users may be monitored in the instance of the online game. The gameplay may be monitored to determine gameplay information. The gameplay information may indicate learned game behavior of the users in the online game. In some implementations, operation 504 may be performed by a gameplay component the same as or similar to gameplay component 114 (shown in FIG. 1 and described herein).

At operation 506, user accounts comprising user information regarding the users may be managed. The user information may include the gameplay information, and/or user presence information. User presence information may indicate whether the users are presently participating in the online game through the client game applications. The user accounts may include a first user account associated with the first user. The first user account may comprise first gameplay information indicating the learned game behavior of the first user, and/or first user presence information indicating whether the first user is presently participating in the online game through the client game application. In some implementations, operation 506 may be performed by an user component the same as or similar to user component 116 (shown in FIG. 1 and described herein).

At an operation 508, one or more occurrences may be identified in the online game. A first occurrence may be identified based on first occurrence information indicating the first occurrence in the online game. The first occurrence may relate to participation in the online game by the first user. In some implementations, operation 508 may be performed by an occurrence identification component the same as or similar to occurrence identification component 118 (shown in FIG. 1 and described herein).

At an operation 510, one or more actions to be executed in the online game may be determined. The one or more actions may be determined based on the gameplay information. The one or more actions may be executed in response to the occurrences identified. Responsive to the first occurrence being identified and/or responsive to a determination that the first user is not presently participating in the online game through any client game application, a first action to be executed in the online game may be determined for the first user. The determination that the first user is not presently participating in the online game through any client game application may be based on the first user presence information. The first action to be executed may be determined based on the first gameplay information indicating the learned behavior of the first user. In some implementations, operation 510 may be performed by an action component the same as or similar to action component 120 (shown in FIG. 1 and described herein).

At an operation 512, the one or more determined actions may be executed in the online game without launching the client game application. The one or more determined actions may be executed responsive to identification of one or more of the occurrences. The first action may be executed in the online game for the first user. In some implementations, operation 512 may be performed by an action component and/or a game component the same as or similar to action component 120 and/or game component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:
1. A system for comprising:
one or more physical computer processors configured by machine-readable instructions to:
execute an instance of an online game, and to implement the instance of the online game by receiving commands from client computing platforms associated with users and executing the commands in the instance of the online game to facilitate participation of the users in the online game through a client game application implemented on the client computing platforms, wherein the users include a first user participating in the online game through the client game application implemented on a first client computing platform, wherein the instance of the online game is persistent such that a virtual space with which the first user interacts within the instance of the online game changes based on actions of one or more users other than the first user when the first user is not participating in the online game through the client game application;
monitor gameplay of the users in the instance of the online game to determine gameplay information, wherein the gameplay information indicates learned game behavior of the users in the online game;
manage user accounts comprising user information regarding the users, the user information including the gameplay information and user presence information indicating whether the users are presently participating in the online game through the client game applications, wherein the user accounts include a first user account associated with the first user, the first user account comprising first gameplay information indicating learned game behavior of the first user and first user presence information indicating whether the first user is presently participating in the online game through the client game application;
identify occurrences in the online game such that a first occurrence is identified based on first occurrence information indicating the first occurrence in the online game;
determine one or more actions, based on the gameplay information, to be executed in the online game in response to the occurrences identified, wherein responsive to the first occurrence being identified and further responsive to a determination, based on the first user presence information, that the first user is not presently participating in the online game through any client game application at a time of the first occurrence, a first action to be executed in the online game is determined for the first user based on the first gameplay information indicating the learned game behavior of the first user;
initiate execution of the first action in the online game on behalf of the first user without launching the client game application responsive to identification of one or more of the occurrences; and
generate a notification for presentation to the first user on the first client computing platform associated with the first user, the notification indicating the first occurrence and the first action initiated on behalf of the first user, wherein the notification includes a cancel option, wherein user selection of the cancel option instructs the system to stop execution of the first action before the first action is fully executed in the online game.

2. The system of claim 1, wherein the notification includes at least one of a text notification, an audible notification, a voice notification, a push notification, or a haptic notification.

3. The system of claim 1, wherein the notification includes one or more action options indicating actions alternative to the first action, such that responsive to receiving acceptance of the one or more action options from the first client computing platform, one or more actions corresponding to the one or more action options are executed within the online game.

4. The system of claim 1, wherein monitoring the gameplay to generate the first gameplay information includes:
obtaining past response information for the first user regarding past responses to one or more of the occurrences in the online game by the first user; and
determining the first gameplay information based on the past response information for the first user.

5. The system of claim 1, wherein the one or more determined actions includes a set of actions such that the first action includes a first set of actions.

6. The system of claim 1, wherein the client computing platforms associated with the users include wearable devices.

7. The system of claim 1, wherein the one or more computer processors are further configured by machine readable instructions to:
obtain user activity information, the user activity information relating to real world activity by the first user;
wherein the one or more actions are further determined based on the user activity information such that the first action is further based on first user activity information relating to the real world activity by the first user.

8. The system of claim 1, wherein the first action is executed in the online game without requiring the first client computing platform to be connected to a network when the first action is executed.

9. A method for determining and executing actions in an online game, the method being implemented in a computer system that includes one or more processors configured by machine-readable instructions, the method comprising:
executing an instance of an online game, wherein executing the instance of the online game includes receiving commands from client computing platforms associated with users and executing the commands in the instance of the online game to facilitate participation of the users in the online game through a client game application implemented on the client computing platforms, wherein the users include a first user participating in the online game through the client game application implemented on a first client computing platform, wherein the instance of the online game is persistent such that a virtual space with which the first user interacts within the instance of the online game changes based on actions of one or more users other than the first user when the first user is not participating in the online game through the client game application;
monitoring gameplay of the users in the instance of the online game to determine gameplay information, wherein the gameplay information indicates learned game behavior of the users in the online game;
managing user accounts comprising user information regarding the users, the user information including the gameplay information and user presence information indicating whether the users are presently participating in the online game through the client game applications, wherein the user accounts include a first user account associated with the first user, the first user account comprising first gameplay information indicating learned game behavior of the first user and first user presence information indicating whether the first user is presently participating in the online game through the client game application;
identifying occurrences in the online game such that a first occurrence is identified based on first occurrence information indicating the first occurrence in the online game;
determining one or more actions, based on the gameplay information, to be executed in the online game in response to the occurrences identified, wherein responsive to the first occurrence being identified and further responsive to a determination, based on the first user presence information, that the first user is not presently participating in the online game through any client game application at a time of the first occurrence, a first action to be executed in the online game is determined for the first user based on the first gameplay information indicating the learned game behavior of the first user;

initiating execution of the first action in the online game on behalf of the first user without launching the client game application responsive to identification of one or more of the occurrences; and generating a notification for presentation to the first user on the first client computing platform associated with the first user, the notification indicating the first occurrence and the first action initiated on behalf of the first user, wherein the notification includes a cancel option, wherein user selection of the cancel option causes execution of the first action to stop before the first action is fully executed in the online game.

10. The method of claim 9, wherein the notification includes at least one of a text notification, an audible notification, a voice notification, a push notification, or a haptic notification.

11. The method of claim 9, wherein the notification includes one or more action options indicating actions alternative to the first action, such that responsive to receiving acceptance of the one or more action options from the first client computing platform, one or more actions corresponding to the one or more action options are executed within the online game.

12. The method of claim 9, further comprising:
obtaining past response information for the first user regarding past responses to one or more of the occurrences in the online game by the first user; and
determining the first gameplay information based on the past response information for the first user.

13. The method of claim 9, wherein the one or more determined actions includes a set of actions such that the first action includes a first set of actions.

14. The method of claim 9, wherein the client computing platforms associated with the users include wearable devices.

15. The method of claim 9, further comprising:
obtaining user activity information, the user activity information relating to real world activity by the first user;
wherein the one or more actions are further determined based on the user activity information such that the first action is further based on first user activity information relating to the real world activity by the first user.

16. The method of claim 9, wherein the first action is executed in the online game without requiring the first client computing platform to be running the client game application when the first action is executed.

* * * * *